US012700178B2

(12) United States Patent
Kim et al.

(10) Patent No.: US 12,700,178 B2
(45) Date of Patent: Aug. 4, 2026

(54) BUILDING MODELING METHOD USING AERIAL LIDAR AND COMPUTER PROGRAM RECORDED ON RECORDING MEDIUM TO EXECUTE THE SAME

(71) Applicant: MOBILTECH, Seoul (KR)

(72) Inventors: Jae Seung Kim, Seoul (KR); Eun Taek Shin, Seoul (KR)

(73) Assignee: MOBILTECH, Seoul (KR)

( * ) Notice: Subject to any disclaimer, the term of this patent is extended or adjusted under 35 U.S.C. 154(b) by 165 days.

(21) Appl. No.: 18/746,871

(22) Filed: Jun. 18, 2024

(65) Prior Publication Data

US 2025/0029332 A1    Jan. 23, 2025

(30) Foreign Application Priority Data

Jul. 21, 2023    (KR) ......................... 10-2023-0095432

(51) Int. Cl.
*G06T 17/05* (2011.01)
*G06V 10/26* (2022.01)
(Continued)

(52) U.S. Cl.
CPC .............. *G06T 17/05* (2013.01); *G06V 10/26* (2022.01); *G06V 10/764* (2022.01); *G06V 20/17* (2022.01);
(Continued)

(58) Field of Classification Search
CPC ........... G06T 17/05; G06T 2207/10028; G06T 2207/10032; G06T 17/10;
(Continued)

(56) References Cited

U.S. PATENT DOCUMENTS

2011/0149267 A1* 6/2011 Welty ...................... G01S 17/00
356/4.01
2019/0279420 A1* 9/2019 Moreno .................. G06T 17/10
2021/0398300 A1* 12/2021 Gupta ....................... G06T 7/33

FOREIGN PATENT DOCUMENTS

KR          10-1421128 B1      7/2014
KR      10-2017-0007102 A      1/2017
KR      10-2022-0162487 A     12/2022

OTHER PUBLICATIONS

Fayez et al., "Automatic Filtering of Lidar Building Point Cloud in Case of Trees Associated to Building Roof", Remote Sensing, Jan. 17, 2022.

* cited by examiner

*Primary Examiner* — Hau H Nguyen
(74) *Attorney, Agent, or Firm* — Bridgeway IP Law Group, PLLC; Jihun Kim

(57)          ABSTRACT

A building modeling method may include separating, by a data generating device, a point cloud corresponding to a ground and a point cloud corresponding to a non-ground from aerial point cloud data acquired from a LiDAR mounted on a flight device, classifying, by the data generating device, a point cloud corresponding to a roof of a building among the point clouds corresponding to the non-ground, and modeling, by the data generating device, the building based on the classified point cloud. The present method is technology developed with the support of the Ministry of Trade, Industry and Energy/Korea Planning & Evaluation Institute of Industrial Technology (Task No. 20022003/Project Name-Automotive Industry Technology Development Project/Task Name-Development of industrial autonomous driving and stability securing technology based on vertical and horizontal linkage).

9 Claims, 18 Drawing Sheets

(51) Int. Cl.
*G06V 10/764*          (2022.01)
*G06V 20/10*            (2022.01)
*G06V 20/17*            (2022.01)

(52) U.S. Cl.
CPC ........ *G06V 20/176* (2022.01); *G06T 2210/56*
(2013.01)

(58) Field of Classification Search
CPC . G06T 2207/30188; G06T 7/50; G06F 18/24;
G06F 2218/12; G06F 30/13; G06V
20/176; G06V 10/764
See application file for complete search history.

250 — Processor

255 — Memory
280a — Software

260 — Transceiver

270

265 — Input/output device

275 — Storage
280b — Software
285 — Database

BUS

200 a (a)

(b)

(c)

(a)

(b)

(a)

BUILDING MODELING METHOD USING AERIAL LIDAR AND COMPUTER PROGRAM RECORDED ON RECORDING MEDIUM TO EXECUTE THE SAME

CROSS REFERENCE TO RELATED APPLICATION

This application claims priority from Republic of Korea Patent Application No. 10-2023-0095432, filed on Jul. 21, 2023, which is hereby incorporated by reference in its entirety.

BACKGROUND

Field

The present disclosure relates to building modeling and, more particularly, to a building modeling method using an aerial light detection and ranging (LiDAR) to model a building by obtaining a point cloud corresponding to a roof of the building based on aerial point cloud data acquired from an aerial LiDAR and a computer program recorded on a recording medium to execute the same.

Related Art

Autonomous driving of a vehicle refers to a system that allows the vehicle to determine and drive on its own. As such, autonomous driving may be divided into progressive stages from non-automation to full automation depending on the degree to which the system participates in driving and the degree to which a driver controls the vehicle. In general, the stages of autonomous driving are divided into six levels classified by SAE (Society of Automotive Engineers) International. According to the six levels classified by the International Association of Automotive Engineers, level 0 is non-automation, level 1 is driver assistance, level 2 is partial automation, level 3 is conditional automation, level 4 is high automation, and level 5 is full automation.

Autonomous driving is performed through mechanisms of perception, localization, path planning, and control. In addition, various companies are developing to implement perception and path planning in autonomous driving mechanisms using artificial intelligence (AI).

For autonomous driving, various information on the road should be collected preemptively. However, in reality, it is not easy to collect and analyze massive amounts of information in real time using only sensors of vehicles. Accordingly, in order for autonomous driving to become a reality, a high-precision road map that may provide various information necessary for actual autonomous driving is essential.

Here, the high-precision road map refers to a three-dimensional electronic map constructed with information on roads and surrounding terrain with an accuracy of ±25 cm. The high-precision road map includes precision information, such as a road width, a road curvature, a road slope, lane information (dotted lines, solid lines, stop lines, etc.), surface type information (crosswalks, speed bumps, shoulders, etc.), road mark information, sign information, and facility information (traffic lights, curbs, manholes, etc.), in addition to general electronic map information (node information and link information required for route guidance).

In order to create a road map with such precision, various related data, such as mobile mapping system (MMS) and aerial photography information are required.

In particular, the MMS is mounted on a vehicle and is used to measure locations of geographic features in the vicinity of the road and obtain visual information while driving the vehicle. In other words, the MMS may be generated based on information collected by the GPS, inertial navigation system (INS), and inertial measurement unit (IMU) for collecting the location of a vehicle body and attitude information, cameras and light detection and ranging (LiDAR) for collecting the shape and information of geographic features, and other sensors.

However, since the mobile mapping system acquires location information based on GPS information, there is a problem of low accuracy in regions with low GPS signal sensitivity, such as alleys.

Accordingly, various studies have recently been conducted to generate precision road maps with higher accuracy.

The present disclosure is technology developed with the support of the Ministry of Trade, Industry and Energy/Korea Planning & Evaluation Institute of Industrial Technology (Task No. 20022003/Project Name-Automotive Industry Technology Development Project/Task Name-Development of industrial autonomous driving and stability securing technology based on vertical and horizontal linkage).

RELATED ART DOCUMENT

Patent Document (Patent Document 1) Korean Application Publication No. 10-2017-0007102, '3D map generating and display device and method', (published on Jan. 18, 2017).

SUMMARY

The present disclosure provides a building modeling method using aerial LiDAR for modeling a building by obtaining a point cloud corresponding to a roof of a building based on aerial point cloud data obtained from aerial LiDAR.

The present disclosure also provides a computer program recorded on a recording medium to execute a building modeling method using aerial LiDAR for modeling a building by obtaining a point cloud corresponding to a roof of a building based on aerial point cloud data obtained from aerial LiDAR.

The technical problems of the present disclosure are not limited to the technical problems mentioned above, and other technical problems not mentioned will be clearly understood by those skilled in the art from the description below.

In an aspect, a building modeling method using an aerial LiDAR to model a building by obtaining a point cloud corresponding to a roof of the building based on aerial point cloud data acquired from an aerial LiDAR is proposed. The method may include separating, by a data generating device, a point cloud corresponding to a ground and a point cloud corresponding to a non-ground from aerial point cloud data acquired from a LiDAR mounted on a flight device, classifying, by the data generating device, a point cloud corresponding to a roof of a building among the point clouds corresponding to the non-ground, and modeling, by the data generating device, the building based on the classified point cloud.

In the separating of a point cloud, the aerial point cloud data may be voxelized to a preset size and the other points, except for a point closest to a center point, among points in a voxel, is deleted to acquire a uniform sample.

In the separating of a point cloud, the filtered aerial point cloud data may be divided into a grid smaller than an average distance between points to generate row and column indexes for each point, a height value of the grid may be set using an interpolation method when there is no point in the grid, an opening calculation may be performed using a window having a preset size, cases before and after the opening calculation is performed may be compared based on a height threshold value to separate the point cloud corresponding to the ground and the point cloud corresponding to the non-ground from each other.

In the separating of a point cloud, the point cloud may be restored by dividing the point cloud corresponding to the separated non-ground based on an octree.

In the classifying of a point cloud, a point cloud corresponding to the roof of the building and a point cloud corresponding to a tree among the point clouds corresponding to the non-ground may be classified based on a number of reflected signals reflected from one pulse from the LiDAR.

In the classifying of a point cloud, a point cloud in which a number of reflected signals reflected from one pulse of the LiDAR exceeds a preset value may be identified as a tree.

In the classifying of a point cloud, a point corresponding to a reflected signal having a signal strength smaller than a preset value, among reflected signals reflected from one pulse of the LiDAR may be deleted.

In the classifying of a point cloud, clustering may be performed based on a density of the point cloud corresponding to the non-ground to remove an outliner and the clustered point cloud may be filtered based on a height value from the ground to classify the point cloud corresponding to the roof of the building.

In the modeling, an edge of the roof may be estimated based on a distribution of the classified point cloud and an outer point of the classified point cloud may be fit based on the estimated edge.

In the modeling, a covariance matrix using neighboring points of each point included in the classified point cloud may be obtained, an eigenvector may be obtained through principal component analysis (PCA) on the covariance matrix, and two eigenvectors in which an angle therebetween is within a threshold value may be estimated as the edge of the roof.

In the modeling, a basic primitive of the classified point cloud may be detected and the classified point cloud is modeled as the roof according to the detected basic primitive.

In the modeling, texture mapping of at least one image to the modeled roof may be performed based on location information of at least one image captured by a camera installed with the LiDAR and direction information of the camera.

In another aspect, a computer program recorded on a recording medium to execute the above method is provided. The computer program may be combined with a computing device including a memory, a transceiver, and a processor processing an instruction loaded in the memory. The computer program may be a computer program recorded in a recording medium to execute separating, by the processor, a point cloud corresponding to a ground and a point cloud corresponding to a non-ground from aerial point cloud data acquired from a LiDAR mounted on a flight device, classifying, by the processor, a point cloud corresponding to a roof of a building among the point clouds corresponding to the non-ground, and modeling, by the processor, the building based on the classified point cloud.

Specific details of other embodiments are included in the detailed description and drawings.

According to embodiments of the present disclosure, shaded regions on a map may be effectively improved by updating the map using data acquired from other sensors for regions with low global positioning system (GPS) signal sensitivity on a precision road map generated based on GPS information.

The effects of the present disclosure are not limited to the effects mentioned above, and other effects not mentioned may be clearly understood by those skilled in the art from the description of the claims.

DESCRIPTION OF EXEMPLARY EMBODIMENTS

Figure 1:
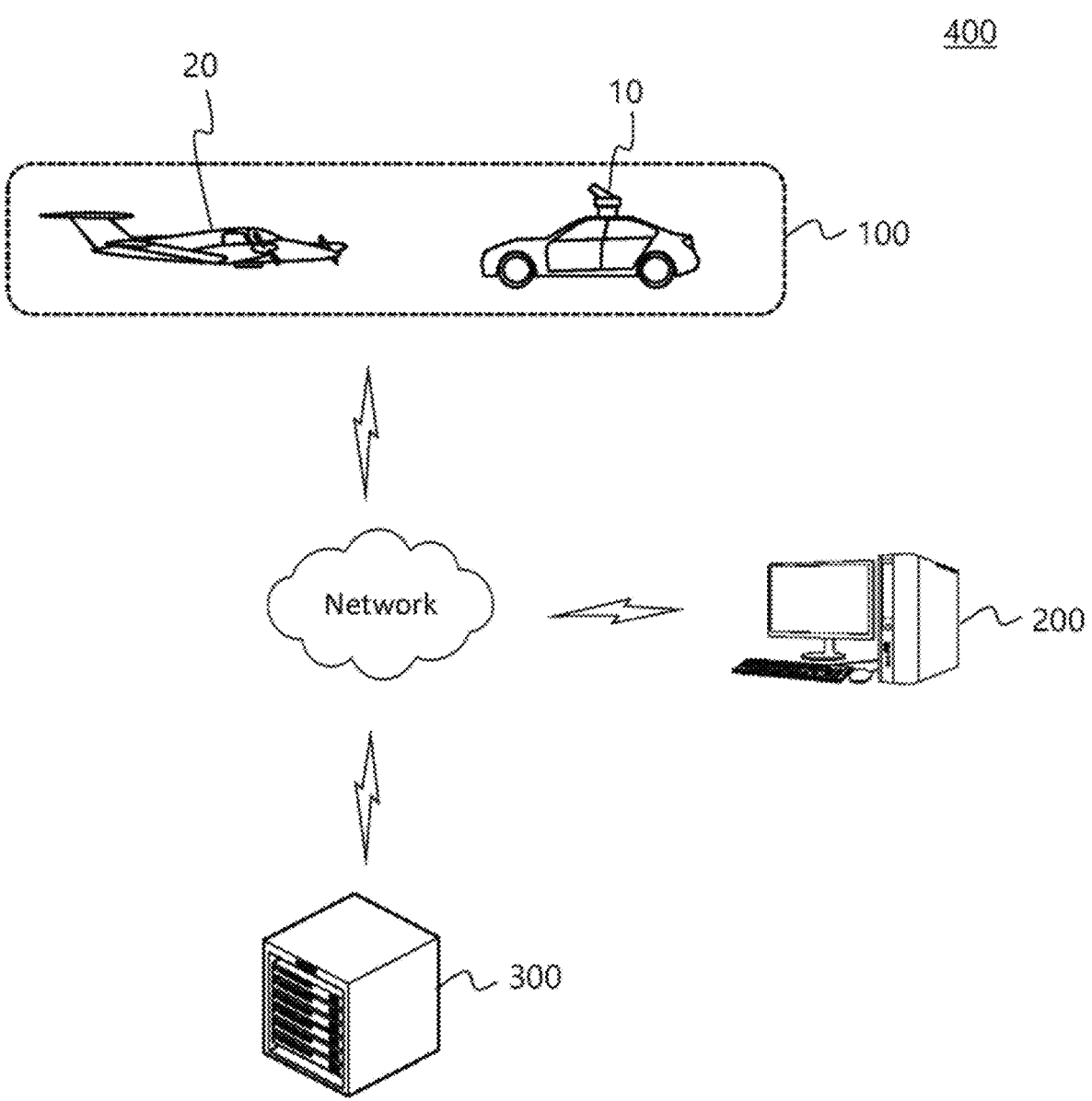
FIG. 1 is a configuration diagram of a data generating system according to an embodiment of the present disclosure.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that may be properly understood by the skilled person in the art. In addition, general terms used in the description of the present disclosure should be construed according to definitions in dictionaries or according to its front or rear context, and should not be construed to have an excessively restrained meaning.

The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element may be directly connected with the other element or intervening elements may also be present. In contrast, when an element is referred to as being "directly connected with" another element, there are no intervening elements present.

Embodiments of the present disclosure will be described below in detail with reference to the accompanying drawings where those components are rendered the same reference number that are the same or are in correspondence, regardless of the figure number, and redundant explanations are omitted. In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings. The idea of the present disclosure should be construed to extend to any alterations, equivalents and substitutes besides the accompanying drawings.

Meanwhile, a mobile mapping system (MMS) is mounted on a vehicle and is used to measure locations of geographic features in the vicinity of the road and obtain visual information while driving the vehicle. In other words, the MMS may be generated based on information collected by the global positioning system (GPS), inertial navigation system (INS), and inertial measurement unit (IMU) for collecting the location of a vehicle body and attitude information, cameras and light detection and ranging (LiDAR) for collecting the shape and information of geographic features, and other sensors.

However, since the mobile mapping system acquires location information based on GPS information, there is a problem of low accuracy in regions with low GPS signal sensitivity, such as alleys.

Accordingly, various studies have recently been conducted to generate precision road maps with higher accuracy.

In order to overcome these limitations, the present disclosure suggests various units capable of modeling buildings using aerial point cloud data obtained from aerial LiDAR and updating a map using data obtained from other sensors for regions with low GPS signal sensitivity on a precision road map generated based on GPS information.

FIG. 1 is a configuration diagram of a data generating system according to an embodiment of the present disclosure.

Referring to FIG. 1, a data generating system 400 according to an embodiment of the present disclosure may include a data collecting device 100, a data generating device 200, and a data processing device 300.

The components of the data generating system 400 according to the present embodiment merely represent functionally distinct elements, so two or more components may be integrated to be implemented in an actual physical environment or one component may be separated to be implemented in an actual physical environment.

To describe each component, the data collecting device 100 may collect data necessary for generating maps and learning data.

The data collecting device 100 may be configured to include one or more of LiDAR, a camera, a radar, an IMU, and a GPS. However, the data collecting device 100 is not limited thereto, and sensors capable of sensing various information may be applied to generate a precise road map.

That is, the data collecting device 100 may acquire point cloud data from a LiDAR and acquire images captured by a camera. In addition, the data collecting device 100 may acquire information related to a location and a pose from an IMU, GPS, etc.

Here, the LiDAR may fire laser pulses around a vehicle and detect light reflected by objects located around the vehicle, thereby generating point cloud data corresponding to a 3D image around the vehicle.

The camera may acquire images of a space collected from the LiDAR based on the LiDAR. The camera may include any one of a color camera, a near infrared (NIR) camera, a short wavelength infrared (SWIR) camera, and a long wavelength infrared (LWIR) camera.

The IMUs may include an acceleration sensor and an angular velocity sensor (gyroscope), and some may also include a magnetometer and may measure a change in acceleration according to a change in the movement of the data collecting device 100.

The GPS may receive signals transmitted from artificial satellites and measure the location of the data collecting device 100 using triangulation.

The data collecting device 100 may be installed on the vehicle 10 or a flight device 20. For example, the data collecting device 100 may be installed on the top of the vehicle 10 to collect surrounding point cloud data or may be installed at the bottom of the flight device 20 to collect point cloud data or images of objects on the ground from the air.

In addition, the data collecting device 100 may transmit the collected point cloud data or images to the data generating device 200.

As a next component, the data generating device 200 may receive the point cloud data acquired by the LiDAR and the images captured by the camera from the data collecting device 100.

The data generating device 200 may generate a precision road map based on the point cloud data obtained from LiDAR and the images captured using the camera.

Characteristically, according to an embodiment of the present disclosure, the data generating device 200 may separate point clouds corresponding to the ground and point clouds corresponding a non-ground from the aerial point cloud data acquired from the LiDAR mounted on an airplane and classify point clouds corresponding to a roof of a building among the point clouds corresponding to the non-ground. In addition, the data generating device 200 may model a building based on the classified point clouds.

According to another embodiment of the present disclosure, the data generating device 200 may load a reference map generated based on location information acquired by the GPS device and first point cloud data acquired from a first LiDAR and update the reference map based on second point cloud data acquired from a second LiDAR mounted on the vehicle traveling on a path of the reference map.

Meanwhile, a specific configuration of the data generating device 200 according to embodiments of the present disclosure is described below with reference to the drawings.

The data generating device 200, which has the above characteristics, may be any device that may transmit and receive data to and from the data collecting device 100 and the data processing device 300 and perform calculation based on the transmitted and received data. For example, the data generating device 200 may be any one of fixed computing devices, such as a desktop, a workstation, or a server, but is not limited thereto.

As a next component, the data processing device 300 may process the map generated by the data generating device 200.

For example, the data processing device 300 may correct facility information on the map generated by the data generating device 200 or remove noise from the generated map. In addition, the data processing device 300 may detect a specific object in the generated map or perform weight reduction on the data.

The data processing device 300, which has the above characteristics, may be any device that may transmit and receive data to and from the data collecting device 100 and the data generating device 200 and perform calculation based on the transmitted and received data. For example, the data processing device 300 may be any one of fixed computing devices, such as a desktop, a workstation, or a server, but is not limited thereto.

The data collecting device 100, the data generating device 200, and the data processing device 300 described above may transmit and receive data using a combination of one or more of a security line, a public wired communication network, or a mobile communication network that directly connect the devices.

For example, the public wired communication network may include Ethernet, x digital subscriber line (xDSL), hybrid fiber coax (HFC), and fiber to the home (FTTH) but is not limited thereto.

In addition, the mobile communication network may include code division multiple access (CDMA), wideband CDMA (WCDMA), high speed packet access (HSPA), long term evolution (LTE), and 5th generation mobile telecommunication but is not limited thereto.

Figure 2:
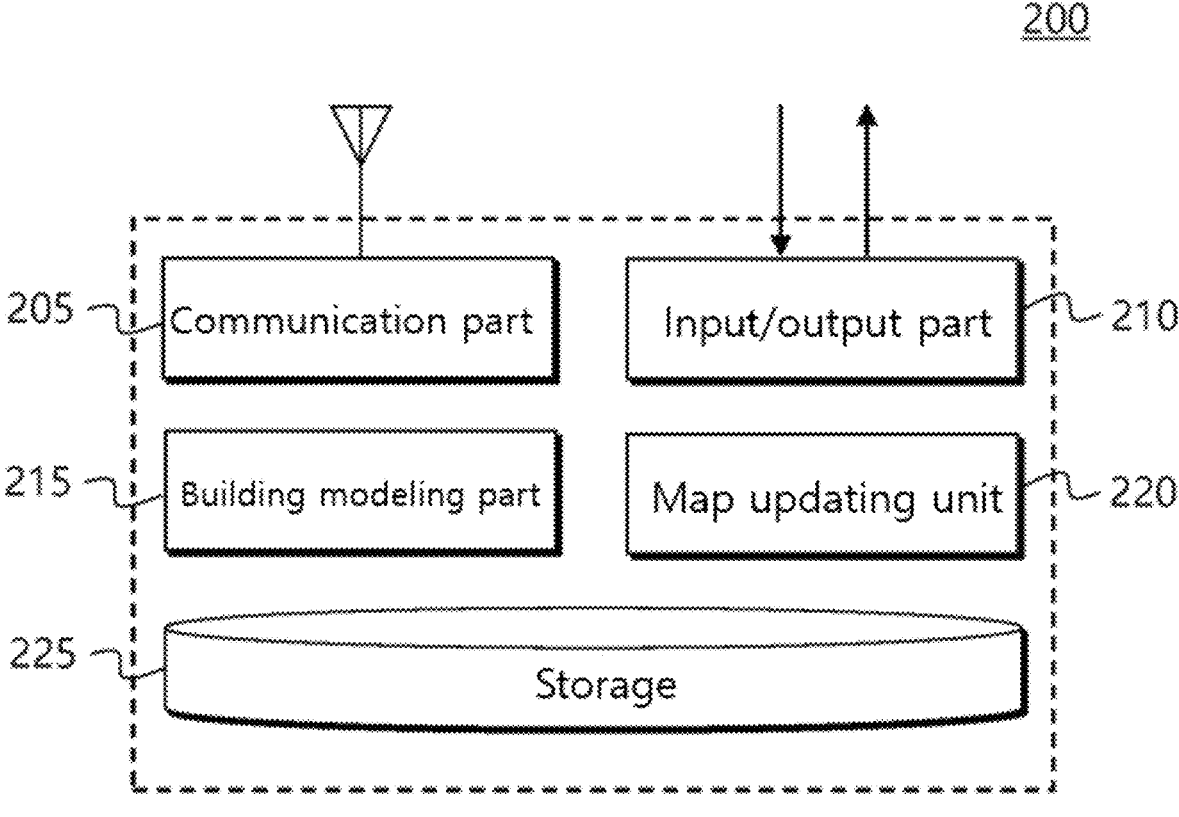
FIG. 2 is a logical configuration diagram of a data generating device according to an embodiment of the present disclosure.

FIG. 2 is a logical configuration diagram of the data generating device according to an embodiment of the present disclosure.

Referring to FIG. 2, the data generating device 200 according to an embodiment of the present disclosure includes a communication part 205, an input/output part 210, a building modeling part 215, a map updating unit 220, and a storage 225.

Since the components of the data generating device 200 merely represent functionally distinct elements, two or more components may be integrated to be implemented in the actual physical environment or one component may be separated to be implemented in the actual physical environment.

To describe each component, the communication part 205 may transmit and receive data to and from the data collecting device 100 and the data processing device 300. Specifically, the communication part 205 may receive point cloud data acquired by the LiDAR and images captured through the camera from the data collecting device 100.

As a next component, the input/output part 210 may receive signals from a user through a user interface (UI) or output calculation results to the outside. Specifically, the input/output part 210 may receive set values required for building modeling and map updating. In addition, the input/output part 210 may output the generated a building model and a map.

As a next component, the building modeling part 215 may model a building by acquiring a point cloud corresponding to a roof of the building based on aerial point cloud data acquired from aerial LiDAR.

To this end, the building modeling part 215 may separate a point cloud corresponding to the ground and a point cloud corresponding to a non-ground from the aerial point cloud data acquired from the LiDAR mounted on a flight device.

Specifically, the building modeling part 215 may voxelize the aerial point cloud data to a preset size and delete the other points, except for a point closest to the center point, among points in the voxel, to acquire a uniform sample.

However, the present disclosure is not limited thereto, and the building modeling part 215 may specify a search radius for each point included in the aerial point cloud data and specify a threshold value for a minimum number of points within the search radius. Thereafter, the building modeling part 215 may remove the points if the number of points present within the radius of each point is less than the threshold value.

In addition, the building modeling part 215 may remove a point exceeding a preset threshold value on the assumption that an average distance between each point included in the aerial point cloud data and neighboring points follows a Gaussian distribution. That is, the building modeling part 215 may specify the number of neighboring points and a standard deviation multiplier and calculate the average distance between each point and neighboring points, and if the standard deviation for the calculated average distance exceeds a preset threshold value, the building modeling part 215 may delete the corresponding point.

In this manner, the building modeling part 215 may filter the collected aerial point cloud data to improve a calculation speed according to ground and non-ground separation, roof separation, and building modeling, which are to be described below.

The building modeling part 215 may divide the filtered aerial point cloud data into a grid smaller than the average distance between points and generate row and column indexes for each point. Here, the building modeling part 215 may set a height value of the grid using an interpolation method if there are no points in the defined grid.

Here, nearest neighbor interpolation, which may set the height value of the corresponding grid using a height value of the nearest point, may be applied as the interpolation method.

In addition, the building modeling part 215 may perform an opening calculation using a window having a preset size and compare cases before and after the opening calculation is performed based on a height threshold value to separate a point cloud corresponding to the ground and a point cloud corresponding to a non-ground from each other. That is, the building modeling part 215 may classify a point cloud having a threshold value or greater as a point corresponding to the non-ground. Here, the building modeling part 215 may perform the opening calculation repeatedly based on a preset size of the window and the number of repetitions.

However, the present disclosure is not limited thereto, and the building modeling part 215 may separate the point cloud corresponding to the ground and the point cloud corresponding to the non-ground from the aerial point cloud data by applying cloth simulation technology.

That is, the building modeling part 215 may determine the number of particles to make up a cloth by inverting the point cloud included in the aerial point cloud data vertically and then applying the grid having a preset size. In addition, the building modeling part 215 may define positions of initial cloth particles using the largest height value in the aerial point cloud data and then repeats descent and ascent by gravity and internal force until a change in height of each particle becomes stable. Here, the building modeling part 215 may classify, as a ground point, a point at which a vertical distance to a cloth surface that has reached a final position is smaller than a preset value.

Meanwhile, the ground and non-ground separation method using the aforementioned cloth simulation technology may operate at high speed because the amount of calculation is small but has a problem in that it operates properly only under certain parameters.

In contrast, the ground and non-ground separation method using the aforementioned opening calculation may separate the ground and non-ground with high accuracy regardless of data but has a problem in that the speed is slow due to the large amount of calculations because all points in the window are repeatedly calculated.

Accordingly, the building modeling part 215 may apply the ground and non-ground separation method using the opening calculation and perform filtering on the aerial point cloud data as described above.

Thereafter, the building modeling part 215 may restore the point cloud by dividing the point cloud corresponding to the separated non-ground based on an octree. In other words, the building modeling part 215 may bisect the point cloud corresponding to the separated non-ground in horizontal, vertical, and height directions to obtain eight spaces having the same size and may repeatedly bisect a reduced node to have eight spaces having the same size equally to restore the point cloud.

Through this, the building modeling part 215 may secure high accuracy and separate the ground and non-ground at a high speed.

Next, the building modeling part 215 may model a building based on the classified point cloud.

Specifically, the building modeling part 215 may classify a point cloud corresponding to the roof of the building and a point cloud corresponding to a tree among the point clouds corresponding to the non-ground based on the number of reflected signals reflected from one pulse radiated from the LiDAR.

In other words, in order to perform modeling on the building using aerial LiDAR data, it is important to extract the point cloud corresponding to the building and delete an object that does not correspond to the building, such as a tree.

Accordingly, the building modeling part 215 may identify, as a tree, a point cloud in which the number of reflected signals reflected from one pulse of the LiDAR exceeds a preset value.

In other words, as a distance from one LiDAR pulse increases, the radius may increase due to beam divergence, and the number of reflected signals may vary depending on the type of object. For example, in the case of a building, one or two reflected signals may be generated depending on the shape of the roof. Meanwhile, in the case of a tree, three or more reflected signals may be generated because the pulse passes through the leaves.

Accordingly, the building modeling part 215 may identify a tree and delete the point cloud corresponding to the identified tree based on the number of reflected signals using the characteristics that the pulse from the LiDAR cannot pass through a roof of a building but passes through a tree.

Here, the building modeling part 215 may delete a point corresponding to the reflected signal having a signal strength smaller than a preset value, among reflected signals reflected from one pulse of the LiDAR. That is, the building modeling part 215 may delete an unnecessary point based on the strength of the reflected signal.

In addition, the building modeling part 215 may perform clustering based on the density of the point cloud corresponding to the non-ground to remove an outliner and filter the clustered point cloud based on a height value from the ground to classify the point cloud corresponding to the roof of the building. That is, the building modeling part 215 may separate the clustered point cloud into vegetation and non-vegetation and filter a point cloud corresponding to non-vegetation based on the height value to classify the point cloud corresponding to the roof of the building. Here, the building modeling part 215 may separate vegetation and non-vegetation by determining morphological characteristics of the terrain based on spatial coordinate information of the clustered point cloud.

Meanwhile, when modeling a building is performed using the classified point cloud corresponding to the roof of the building as described above, errors may occur because the angle of the surface is not constant in a texture process to be described below.

Accordingly, the building modeling part 215 may estimate the edge of the roof based on the distribution of the classified point cloud and fit the outer point of the classified point cloud based on the estimated edge.

Here, the building modeling part 215 may obtain a covariance matrix using neighboring points of each point included in the classified point cloud, obtain an eigenvector through principal component analysis (PCA) on the covariance matrix, and estimate two eigenvectors in which an angle therebetween is within a threshold value as the edge of the roof. That is, the building modeling part 215 may search for a main direction of the edge and cluster the points forming a line segment by using the fact that the angle of the roof edge of a general building is 90°.

In addition, the building modeling part 215 may detect a basic primitive of the classified point cloud and model the classified point cloud as the roof according to the detected basic primitive. That is, the building modeling part 215 may recognize the shape of the roof by detecting the basic primitive, such as a plane and cylinder for the roof shape of the building, and model the shape of the roof with the corresponding basic primitive. In other words, the building modeling part 215 may find a basic roof shape and model a complicated roof shape as a combination of basic roofs.

Here, the building modeling part 215 may perform optimization on the modeled roof surfaces to create a watertight model. For example, the building modeling part 215 may perform optimization through a cost function expressed by the following equation.

$$F^* = \underset{X}{\arg\min}\lambda_d E_d + \lambda_c E_c + \lambda_T E_T \qquad \text{[Equation]}$$

(Here, X X={xi|xi∈{0,1}} is a binary variable for the roof surface (in this case, 1 denotes survived, otherwise may be 0))

In addition, the building modeling part 215 may perform texture mapping of at least one image to the modeled roof based on location information of at least one image captured by the camera installed with the LiDAR and direction information of the camera. For example, the building modeling part 215 may perform texture mapping through UV mapping.

Meanwhile, when texture mapping is performed using a single image, a portion corresponding to the roof is mapped properly, whereas the exterior wall of the building may not appear properly in the image, so images from various angles should be considered.

Accordingly, the building modeling part 215 may extract an image candidate using a distance a direction of the camera, a location of the camera, and a distance from the camera to the building that is an object of modeling and extract a region corresponding to the exterior wall of the building from the extracted candidate image to perform texture mapping.

Here, the building modeling part 215 may perform texture mapping by calculating a normal vector for the extracted candidate images and extracting an appropriate image among the candidate images using the direction of the camera and a direction and angle of a surface on which texture mapping is to be performed based on the calculated normal vector.

As a next component, the map updating unit 220 may update the map using data acquired from another sensor for an region with low GPS signal sensitivity in a high-precision map generated based on GPS information.

That is, the map updating unit 220 may pre-store a reference map generated based on at least one of point cloud data acquired from the LiDAR based on the GPS information and the images captured by the camera.

Here, since the reference map has been created based on the GPS information, there was a problem in that the map was not properly generated in a region with low GPS signal sensitivity, such as alleys, or a map with serious errors was generated.

Therefore, the map updating unit 220 suggests a method of updating the stored reference map based on a different map generating method that does not use GPS information.

Specifically, the map updating unit 220 may load the reference map generated based on the location information acquired by the GPS device, and the first point cloud acquired from the first LiDAR.

For example, the reference map may be a point cloud map in which the color of the image is mapped to the point cloud data based on the GPS information. However, without being limited thereto, the reference map may also be a point cloud map generated only with point cloud data.

Meanwhile, in the case of loading all reference maps including the point cloud data, not only does it take a lot of time to load, but also a portion that does not need updating is also loaded.

Accordingly, in the process of loading the reference map, the map updating unit 220 may divide the reference map into grids having a preset size and load a reference map corresponding to one selected grid among the divided grids.

Next, the map updating unit 220 may update the reference map based on the second point cloud data obtained from the second LiDAR mounted on the vehicle traveling on the route on the reference map. Here, the map updating unit 220 may receive a second image captured by a second camera installed together with the second LiDAR.

Specifically, the map updating unit 220 may estimate a location of the second LiDAR through normal distribution transform (NDT) matching on the first point cloud data included in the reference map and the second point cloud data acquired from the second LiDAR.

Here, while the map updating unit 220 estimates a location, the vehicle may travel in overlapping regions according to a driving path of the vehicle. In this case, since the point cloud data of the reference map is lost due to the point cloud data included in the region which has been already updated, a point cloud to be a reference may not be present and updating may be additionally performed to distort the map.

Accordingly, the vehicle traveling on the path on the reference map may move along the outermost portion of the reference map from a specific point located in the outermost portion of the reference map, return to the specific point, and then travel on a preset path. For example, the vehicle may make a large circle around the region for updating and enter an internal region to acquire point cloud data or may make a large circle around the region for updating and acquire point cloud data only for the right direction.

In addition, in order to prevent the reference map from being updated with the second point cloud data in the process of estimating the location of the vehicle, the map updating unit 220 may deactivate updating for the reference map by fixing a point cloud included in the first point cloud data in the process of estimating the location of the vehicle.

In addition, in the process of NDT matching, the map updating unit 220 may determine the degree of matching between the first point cloud data and the second point cloud data using a fitness score, which is a sum of errors in the average and covariance between voxels. Here, the fitness score may refer to an average of distances between points whose distance is less than a certain value after each point of the second point cloud data converted into a pose as a result of the NDT matching is matched to the closest one point in the first point cloud data.

The map updating unit 220 may update at least one point at which the fitness score between the first point cloud data and the second point cloud data is lower than a preset value based on the second point cloud data acquired through the second LiDAR.

Specifically, the map updating unit 220 may extract feature points from the second point cloud data. For example, the map updating unit 220 may extract a planer point and an edge point. Here, the map updating unit 220 may voxelize the second point cloud data to accelerate the process. That is, the map updating unit 220 may divide a 3D space into voxels having a preset size and then selects a representative point from each voxel to reduce the size of the second point cloud data.

In addition, the map updating unit 220 may estimate the pose of the second LiDAR by matching a current frame to a previous frame while the vehicle is traveling. That is, the map updating unit 220 may estimate the pose of the second LiDAR by matching a feature point of the current frame and the feature points of the previous frame. Here, the map updating unit 220 may match the feature points of the current frame and the feature points of the previous frame through a normal distributions transform (NDT) or iterative closest point (ICP) algorithm. In addition, the map updating unit 220 may estimate the location of each point based on the estimated pose and update the reference map based on the estimated location.

Meanwhile, as the system moves through space and builds an environment model, measurement errors and sensor drift reflected in the generated map continue to accumulate. Accordingly, the map updating unit 220 may perform updating based on the second point cloud data acquired through the second LiDAR and correct the accumulated error by detecting loop closure.

In addition, the map updating unit 220 may extract a point cloud in which a heading standard deviation indicating an error of location information specified from the GPS device in the first point cloud data is lower than a preset value. Here, the map updating unit 220 may update the point cloud in which the heading standard deviation is lower than the preset value based on third point cloud data acquired from a third LiDAR.

That is, the map updating unit 220 may determine a point cloud in which the heading standard deviation is lower than the preset value as a point cloud that needs updating, and update the reference map based on the third point cloud data acquired from the third LiDAR. Here, the third point cloud data may be aerial point cloud data acquired from the third LiDAR mounted on the flight device flying over the reference map.

Here, the map updating unit 220 may update the reference map by mapping the building modeled through the building modeling part 215 described above onto the reference map.

To sum up, the map updating unit 220 may estimate the current location of the second LiDAR in real time while driving based on the second point cloud data acquired by the second LiDAR installed in the vehicle moving on the path on the reference map. Here, the map updating unit 220 may determine the accuracy of the reference map based on a threshold value of a location error rate according to location estimation.

In addition, the map updating unit 220 may extract a point cloud that needs updating based on the location error rate and update the extracted point cloud based on the second point cloud data.

Here, the map updating unit 220 may identify a point cloud that needs additional updating based on the GPS error rate in order to update the reference map with higher accuracy.

In addition, the map updating unit 220 may update the reference map for the point cloud that needs additional updating based on the third point cloud data acquired from the third LiDAR mounted on the flight device flying above the reference map.

Figure 3:
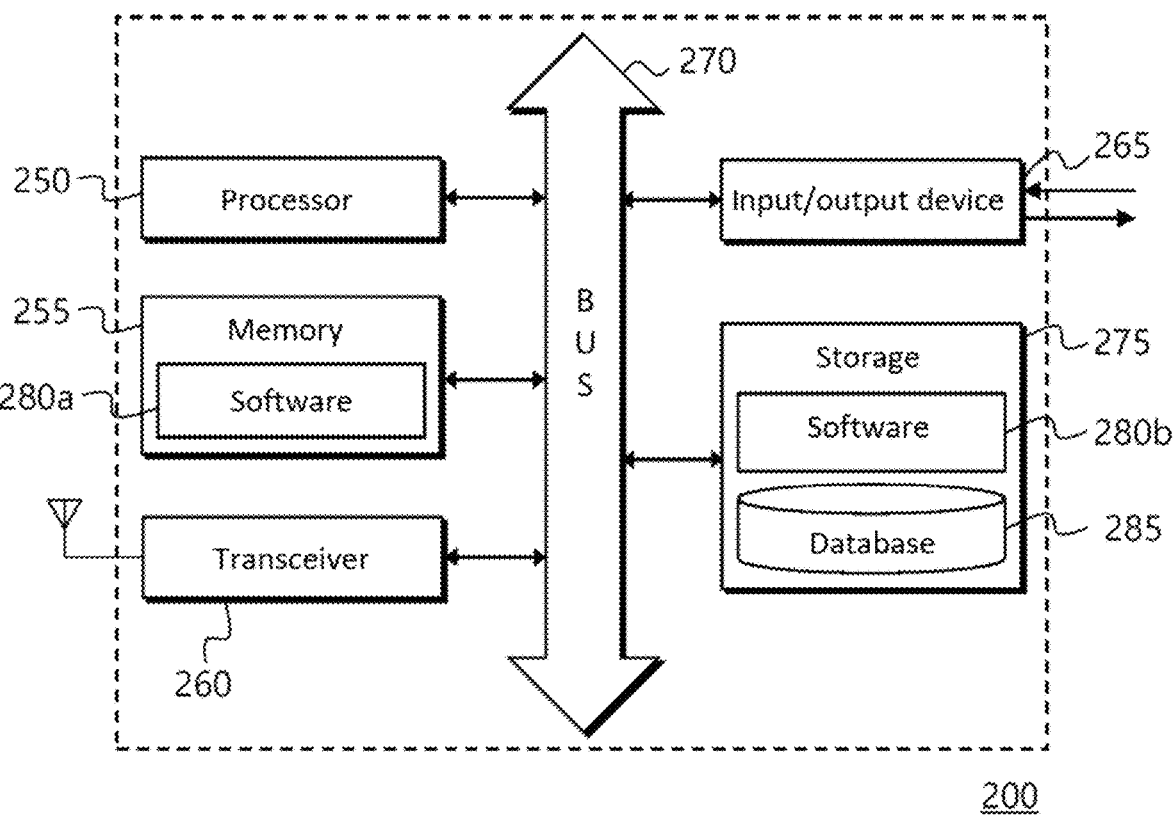
FIG. 3 is a hardware configuration diagram of a data generating device according to an embodiment of the present disclosure.

FIG. 3 is a hardware configuration diagram of the data generating device according to an embodiment of the present disclosure.

Referring to FIG. 3, the data generating device 200 may include a processor 250, a memory 255, a transceiver 260, an input/output device 265, a data bus 270, and storage 275.

The processor 250 may implement the operations and functions of the data generating device 200 based on instructions according to a software 280a loaded in the memory 255. The software 280a implementing the method according to the present disclosure may be loaded in the memory 255. The transceiver 260 may transmit and receive data to and from the data collecting device 100 and the data processing device 300.

The input/output device 265 may receive data required for the operation of the data generating device 200 and output a generated result value. The data bus 270 may be connected to the processor 250, the memory 255, the transceiver 260, the input/output device 265, and the storage 275, and serve as a movement passage for transferring data between each component.

The storage 275 may store an application programming interface (API), a library file, a resource file, etc. required to execute the software 280a in which another method according to the present disclosure is implemented. The storage 275 may store software 280b in which the method according to the present disclosure is implemented. In addition, the storage 275 may store information required to perform a building modeling method and a map updating method. In particular, the storage 275 may include a database 285 that stores programs for performing the building modeling method and the map updating method.

According to an embodiment of the present disclosure, the software 280a or 280b loaded in the memory 255 or stored in the storage 275 may be a program recorded on a recording medium to execute an operation of separating a point cloud corresponding to the ground and a point cloud corresponding to a non-ground from an aerial point cloud acquired from a LiDAR mounted on a flight device by the processor 250, an operation of classifying a point cloud corresponding a roof of a building among point clouds corresponding to the non-ground, and an operation of modeling a building based on the classified point cloud.

According to another embodiment of the present disclosure, the software 280a or 280b loaded in the memory 255 or stored in the storage 275 may be a program recorded on a recording medium to execute an operation of loading, by the processor, a reference map generated based on location information acquired by a GPS device and an operation of updating, by the processor 250, the reference map based on second point cloud data acquired from a second LiDAR mounted on a vehicle traveling on a path on the reference map.

More specifically, the processor 250 may include an application-specific integrated circuit (ASIC), another chipset, a logic circuit, and/or a data processing device. The memory 255 may include read-only memory (ROM), random access memory (RAM), flash memory, a memory card, a storage medium, and/or other storage devices. The transceiver 260 may include a baseband circuit for processing wired and wireless signals. The input/output device 265 may include input devices, such as a keyboard, a mouse, and/or a joystick, image output devices, such as a liquid crystal display (LCD), an organic light emitting diode (OLED), and/or, an active matrix OLED (AMOLED), and printing devices, such as a printer, a plotter, etc.

When the embodiments included in this specification are implemented as software, the aforementioned method may be implemented as a module (process, function, etc.) that performs the aforementioned function. The module may reside in the memory 255 and may be executed by the processor 250. The memory 255 may be internal or external to the processor 250 and may be coupled to the processor 250 by a variety of well-known units.

Each component shown in FIG. 3 may be implemented by various units, for example, hardware, firmware, software, or a combination thereof. In the case of implementation by hardware, an embodiment of the present disclosure may be implemented by one or more of application specific integrated circuits (ASICs), digital signal processors (DSPs), digital signal processing devices (DSPDs), programmable logic devices (PLDs), field programmable gate arrays (FP-GAs), processors, controllers, microcontrollers, microprocessors, etc.

In addition, in case of implementation by firmware or software, an embodiment of the present disclosure is implemented in the form of a module, procedure, function, etc. that performs the functions or operations described above and may be recorded in a readable recording medium through various computer units. Here, the recording medium may include program instructions, data files, data structures, or the like, alone or in combination. The program instructions recorded in the recording medium may be specially designed and configured for the present disclosure or may be known and available to those skilled in computer software. For example, the recording medium includes magnetic mediums such as hard disks, floppy disks, and magnetic tapes, optical mediums such as compact disk read only memory (CD-ROM) or digital video disk (DVD), magneto-optical mediums such as floptical disks, and a hardware device specially configured to store and execute program instructions such as ROM, RAM, flash memory, and the like. Examples of the program instructions include machine codes made by, for example, a compiler, as well as high-level language codes executable by a computer, using an interpreter. The above exemplary hardware device may be configured to operate as at least one software module in order to perform the embodiments of the present disclosure, and vice versa.

Figure 4:
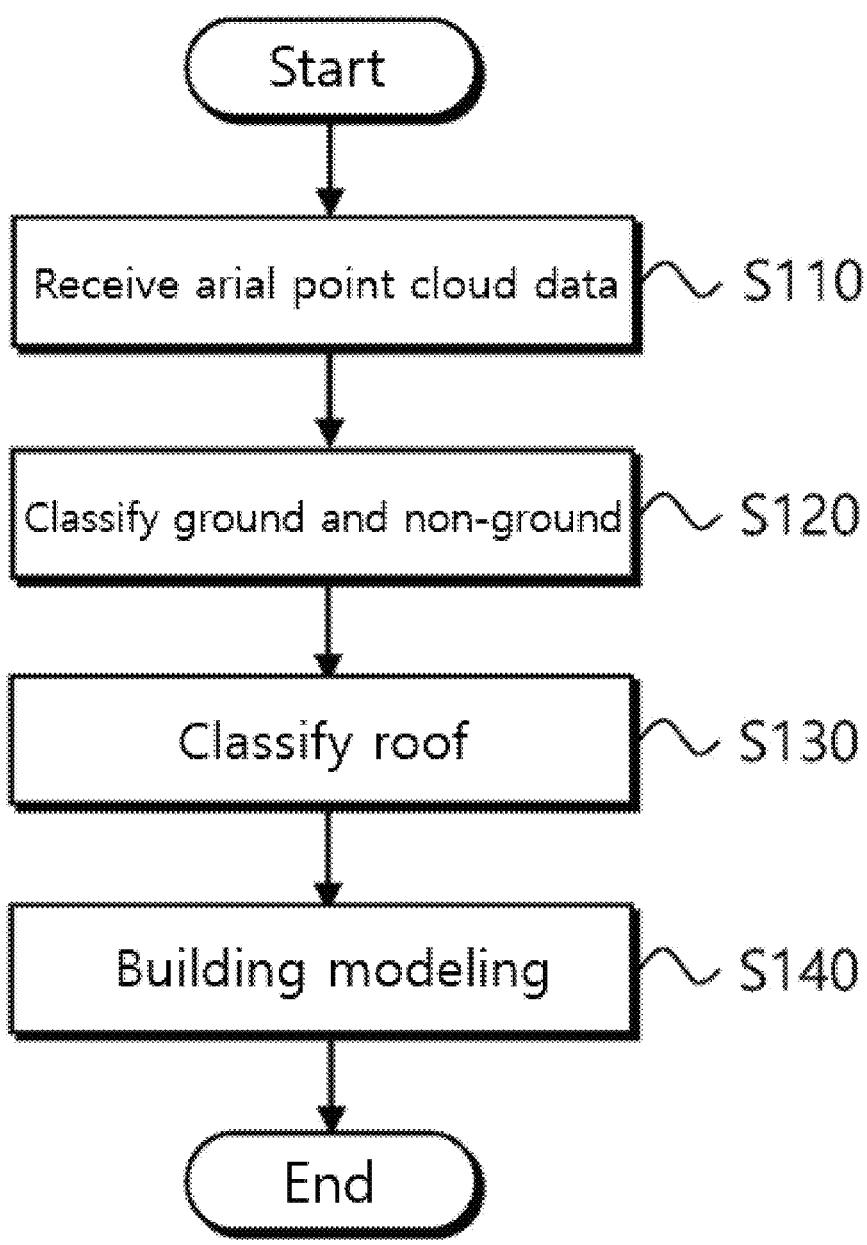
FIG. 4 is a flowchart illustrating a building modeling method according to an embodiment of the present disclosure.

FIG. 4 is a flowchart illustrating a building modeling method according to an embodiment of the present disclosure.

Referring to FIG. 4, first, in operation S110, the data generating device may receive aerial point cloud data acquired from an aerial LiDAR.

Next, in operation S120, the data generating device may separate a point cloud corresponding to the ground and a point cloud corresponding to a non-ground from the aerial point cloud data received in operation S110.

Specifically, the data generating device may voxelize the aerial point cloud data to a preset size and delete the other points, except for a point closest to the center point, among points in the voxel, to acquire a uniform sample and filter the aerial point cloud data.

Thereafter, the data generating device may divide the filtered aerial point cloud data into a grid smaller than the average distance between points and generate row and column indexes for each point. Here, the data generating device may set a height value of the grid using an interpolation method if there are no points in the defined grid.

In addition, the data generating device may perform an opening calculation using a window having a preset size and compare cases before and after the opening calculation is performed based on a height threshold value to separate a point cloud corresponding to the ground and a point cloud corresponding to a non-ground from each other. That is, the data generating device may classify a point cloud having a threshold value or greater as a point corresponding to the non-ground. Here, the data generating device may perform the opening calculation repeatedly based on a preset size of the window and the number of repetitions.

Thereafter, the data generating device may restore the point cloud by dividing the point cloud corresponding to the separated non-ground based on an octree. In other words, the data generating device may bisect the point cloud corresponding to the separated non-ground in horizontal, vertical, and height directions to obtain eight spaces having the same size and may repeatedly bisect a reduced node to have eight spaces having the same size equally to restore the point cloud.

Through this, the data generating device may secure high accuracy and separate the ground and non-ground at a high speed.

Next, in operation S130, the data generating device may classify the roof of the building from the point cloud classified as the non-ground.

Specifically, the data generating device may classify a point cloud corresponding to the roof of the building and a point cloud corresponding to a tree among the point clouds corresponding to the non-ground based on the number of reflected signals reflected from one pulse radiated from the LiDAR.

In other words, the data generating device may identify, as a tree, a point cloud in which the number of reflected signals reflected from one pulse of the LiDAR exceeds a preset value. The data generating device may identify a tree and delete the point cloud corresponding to the identified tree based on the number of reflected signals using the characteristics that the pulse from the LiDAR cannot pass through a roof of a building but passes through a tree.

In addition, the data generating device may perform clustering based on the density of the point cloud corresponding to the non-ground to remove an outliner and filter the clustered point cloud based on a height value from the ground to classify the point cloud corresponding to the roof of the building. That is, the building modeling part 215 may separate the clustered point cloud into vegetation and non-vegetation and filter a point cloud corresponding to non-vegetation based on the height value to classify the point cloud corresponding to the roof of the building. Here, the building modeling part 215 may separate vegetation and non-vegetation by determining morphological characteristics of the terrain based on spatial coordinate information of the clustered point cloud.

Thereafter, the data generating device may estimate the edge of the roof based on the distribution of the classified point cloud and fit the outer point of the classified point cloud based on the estimated edge.

Here, the data generating device may obtain a covariance matrix using neighboring points of each point included in the classified point cloud, obtain an eigenvector through principal component analysis (PCA) on the covariance matrix, and estimate two eigenvectors in which an angle therebetween is within a threshold value as the edge of the roof. That is, the data generating device may search for a main direction of the edge and cluster the points forming a line segment by using the fact that the angle of the roof edge of a general building is 90°.

In addition, the data generating device may detect a basic primitive of the classified point cloud and model the classified point cloud as the roof according to the detected basic primitive. That is, the building modeling part 215 may recognize the shape of the roof by detecting the basic primitive, such as a plane and cylinder for the roof shape of the building, and model the shape of the roof with the corresponding basic primitive.

Here, the data generating device may perform optimization on the modeled roof surfaces to create a watertight model.

Also, in operation S140, the data generating device may perform texture mapping of at least one image to the modeled roof based on location information of at least one image captured by the camera installed with the LiDAR and direction information of the camera.

Figure 5:
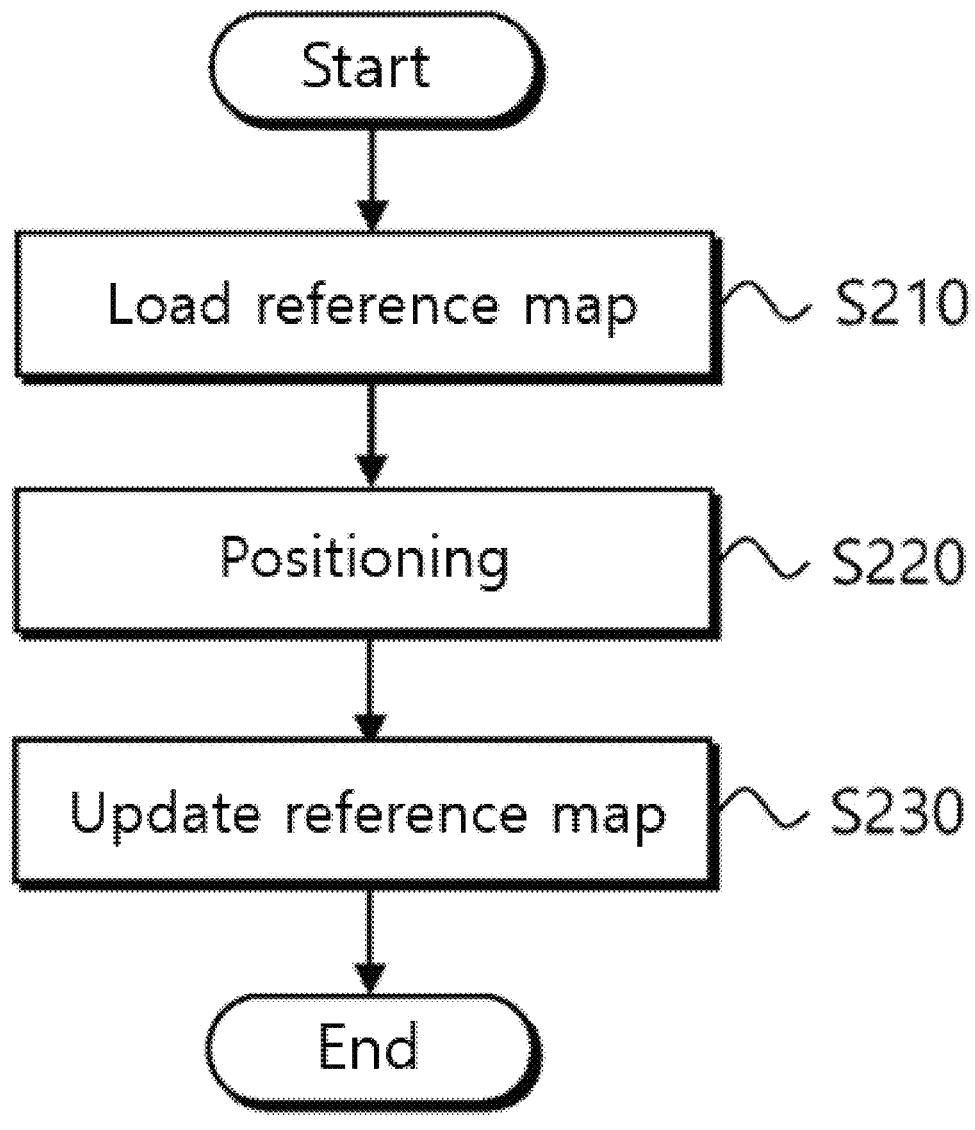
FIG. 5 is a flowchart illustrating a map updating method according to an embodiment of the present disclosure.

FIG. 5 is a flowchart illustrating a map updating method according to an embodiment of the present disclosure.

Referring to FIG. 5, first, in operation S210, the data generating device may load the reference map generated based on the location information acquired by the GPS device, and the first point cloud acquired from the first LiDAR.

Here, in the process of loading the reference map, the data generating device may divide the reference map into grids having a preset size and load a reference map corresponding to one selected grid among the divided grids.

Next, in operation S220, the data generating device may estimate a location of the second LiDAR through normal distribution transform (NDT) matching) on the first point cloud data included in the reference map and the second point cloud data acquired from the second LiDAR.

Here, the data generating device may deactivate updating for the reference map by fixing a point cloud included in the first point cloud data in the process of estimating the location of the vehicle.

Also, in operation S230, the data generating device may update the reference map based on the second point cloud data.

Specifically, in the process of NDT matching, the data generating device may determine the degree of matching between the first point cloud data and the second point cloud data using a fitness score, which is a sum of errors in the average and covariance between voxels.

The data generating device may update at least one point at which the fitness score between the first point cloud data and the second point cloud data is lower than a preset value based on the second point cloud data acquired through the second LiDAR.

Here, the data generating device may perform updating based on the second point cloud data acquired through the second LiDAR and correct the accumulated error by detecting loop closure.

In addition, the data generating device may extract a point cloud in which a heading standard deviation indicating an error of location information specified from the GPS device in the first point cloud data is lower than a preset value.

In addition, the data generating device may update a point cloud in which the heading standard deviation is lower than a preset value based on the third point cloud data obtained from the third LiDAR.

That is, the data generating device may determine a point cloud in which the heading standard deviation is lower than the preset value as a point cloud that needs updating, and update the reference map based on the third point cloud data acquired from the third LiDAR.

Here, the third point cloud data may be aerial point cloud data acquired from the third LiDAR mounted on the flight device flying over the reference map.

FIGS. 6 to 16 are diagrams illustrating a building modeling method according to an embodiment of the present disclosure.

Figure 6:
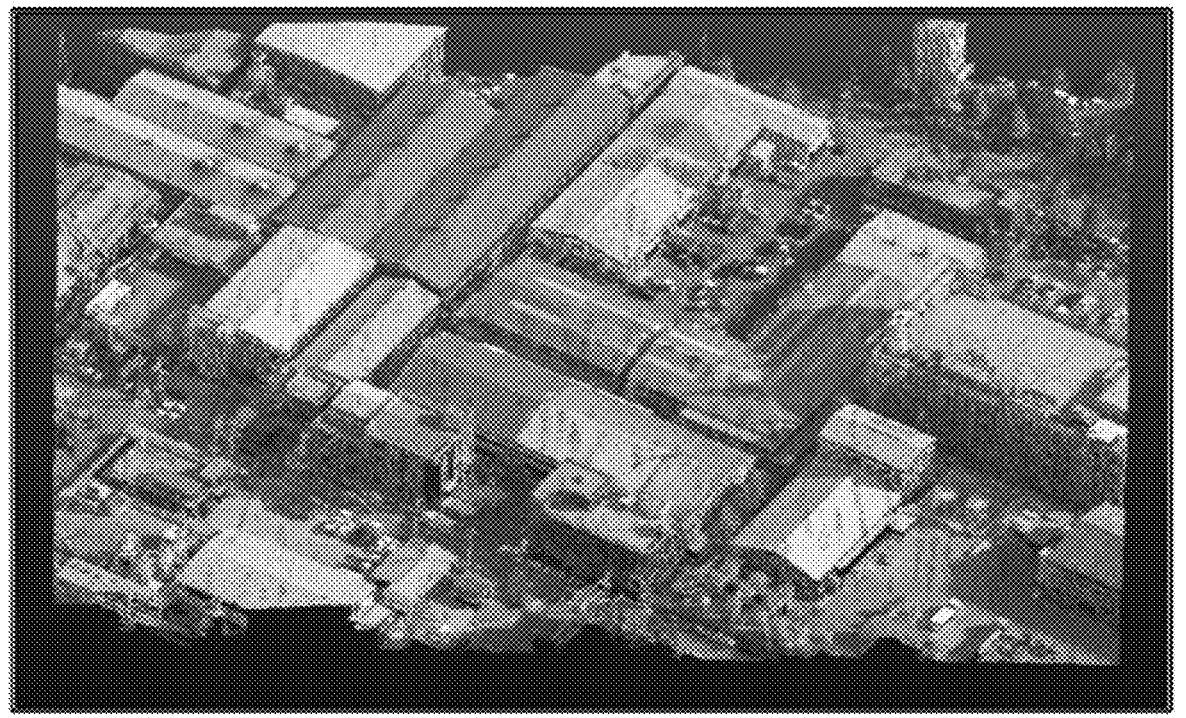
FIGS. 6 to 16 are diagrams illustrating a building modeling method according to an embodiment of the present disclosure.
Figure 7:
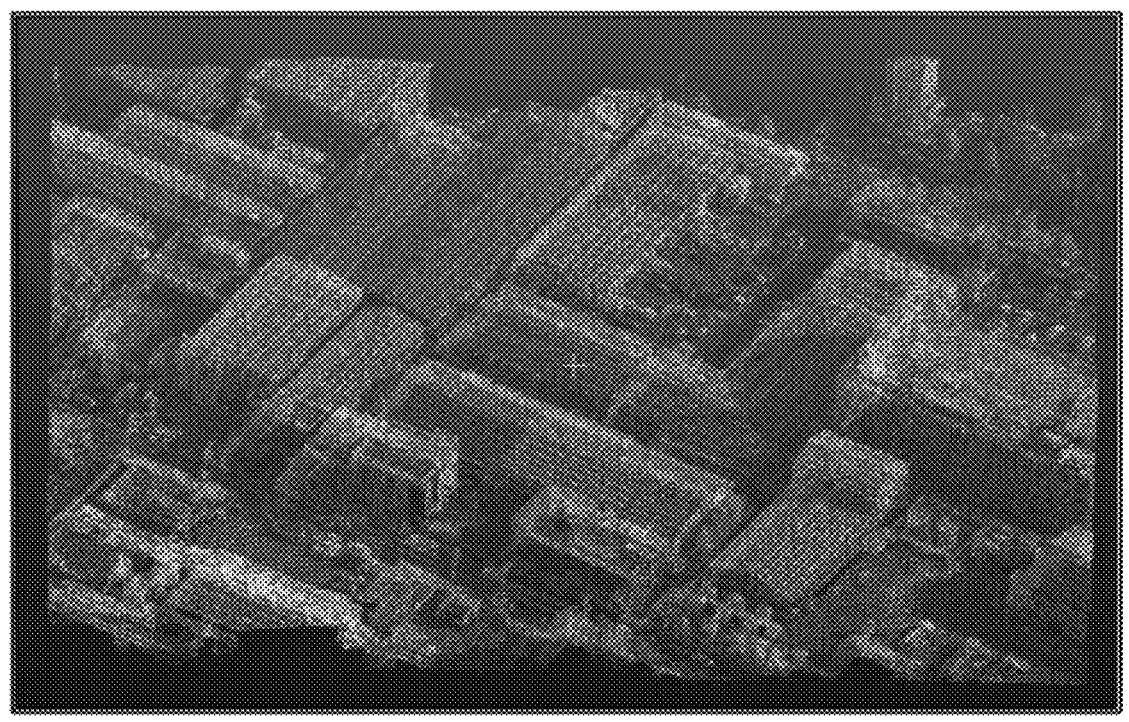

Specifically, FIG. 6 is a diagram illustrating aerial point cloud data acquired through aerial LiDAR, and FIG. 7 is a diagram illustrating a state in which sampling is applied to the aerial point cloud data of FIG. 6.

The data generating device may generate aerial point cloud data as shown in FIG. 7 by approximating a point cloud included in a voxel having a width of 0.5 m in the aerial point cloud data shown in FIG. 6 to the point closest to the center point.

Figure 8:
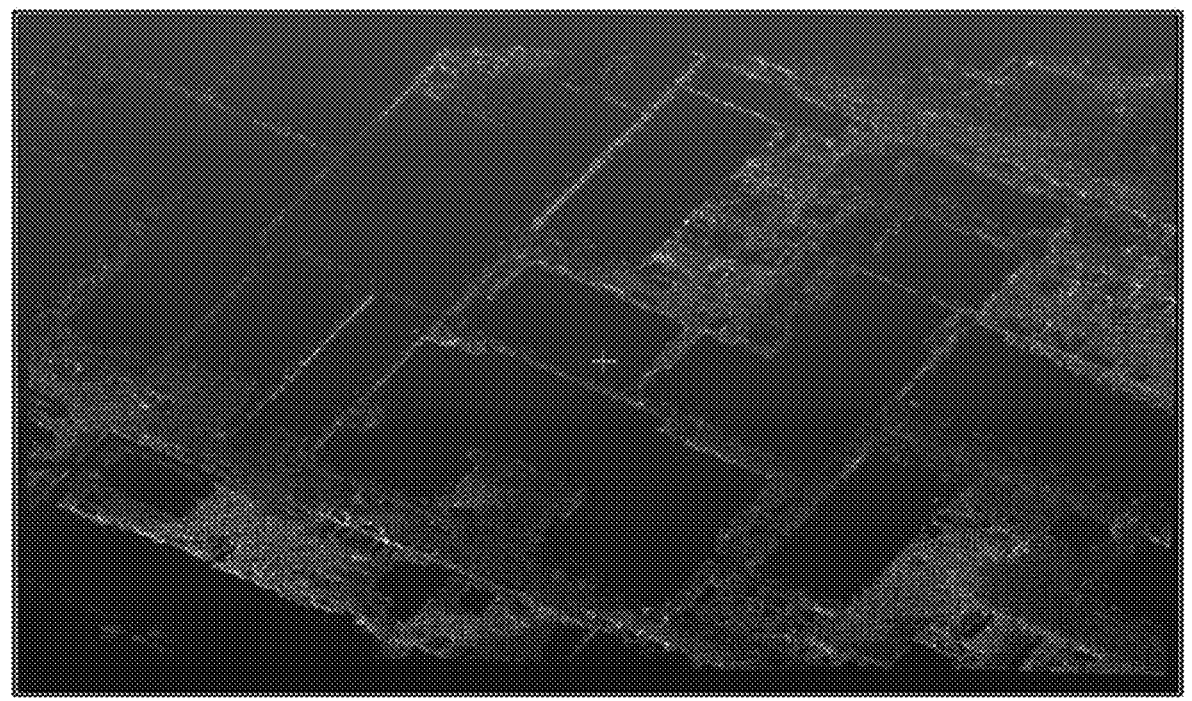

Thereafter, as shown in FIG. 8, the data generating device may perform an opening calculation using a window having a preset size and compare cases before and after the opening calculation is performed based on a height threshold value to separate a point cloud corresponding to the ground and a point cloud corresponding to a non-ground from each other.

Figure 9:
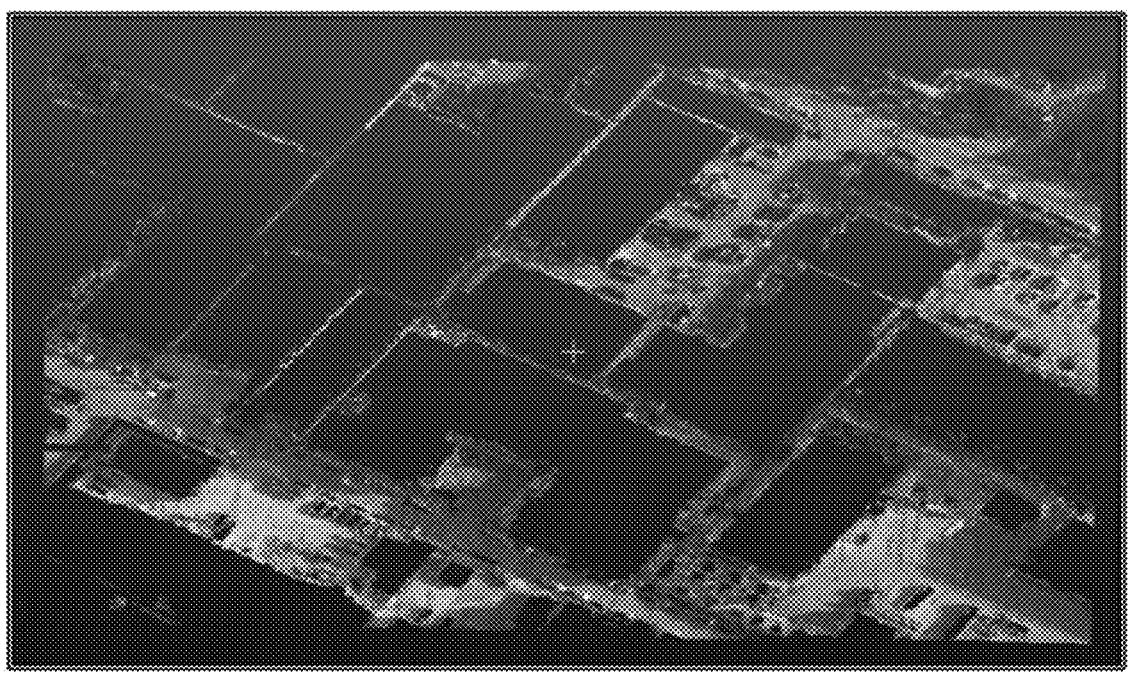

Thereafter, as shown in FIG. 9, the data generating device may restore the point cloud by dividing the point cloud corresponding to the separated non-ground based on an octree.

Figure 10:
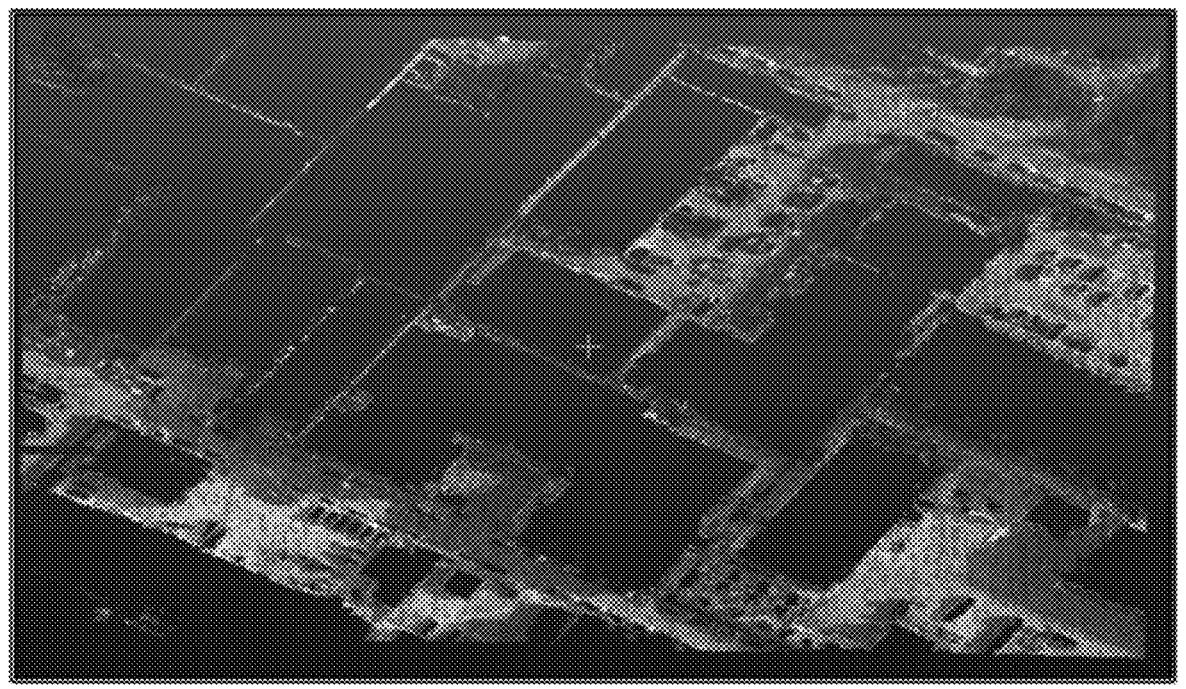

Meanwhile, FIG. 10 is a diagram illustrating a state in which the ground is separated without applying sampling to original aerial data of FIG. 6.

Referring to FIGS. 9 and 10, according to an embodiment of the present disclosure, the results of comparing data obtained by performing restoration after sampling the aerial point cloud data and separating the ground according to an embodiment of the present disclosure with the data obtained by separating the ground without applying sampling to the original aerial data show that they are identical by 95% or more. In addition, the data obtained by separating the ground without applying sampling to the original aerial data took work time of 1800 s, whereas the data obtained by performing restoration after sampling the aerial point cloud data and separating the ground according to an embodiment of the present disclosure took work time of 15 s, which was improved by about 120 times.

Figure 11:
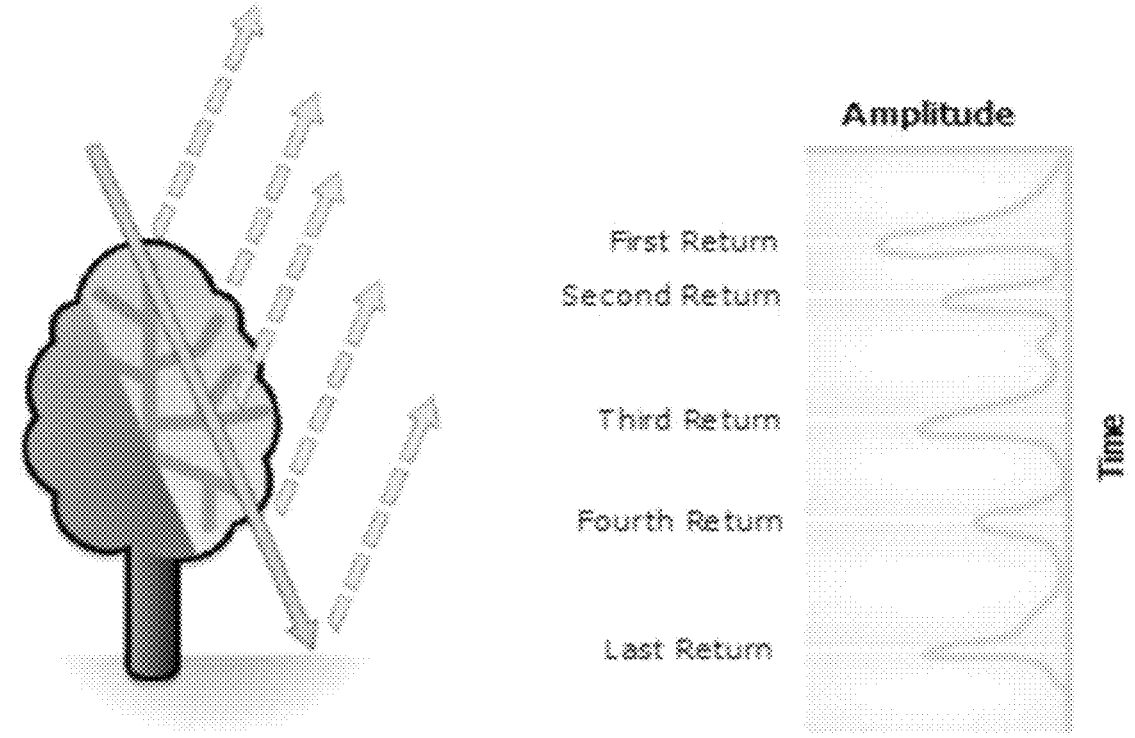

Meanwhile, FIG. 11 is a diagram illustrating a reflected signal reflected from a tree with respect to one pulse emitted from a LiDAR.

As shown in FIG. 11, the data generating device may classify a point cloud corresponding to the roof of the building and a point cloud corresponding to a tree among the point clouds corresponding to the non-ground based on the number of reflected signals reflected from one pulse radiated from the LiDAR.

In other words, as a distance from one LiDAR pulse increases, the radius may increase due to beam divergence, and the number of reflected signals may vary depending on the type of object. For example, in the case of a building, one or two reflected signals may be generated depending on the shape of the roof. Meanwhile, in the case of a tree, three or more reflected signals may be generated because the pulse passes through the leaves.

Accordingly, the data generating device may identify, as a tree, a point cloud in which the number of reflected signals reflected from one pulse of the LiDAR exceeds a preset value.

Figure 12:
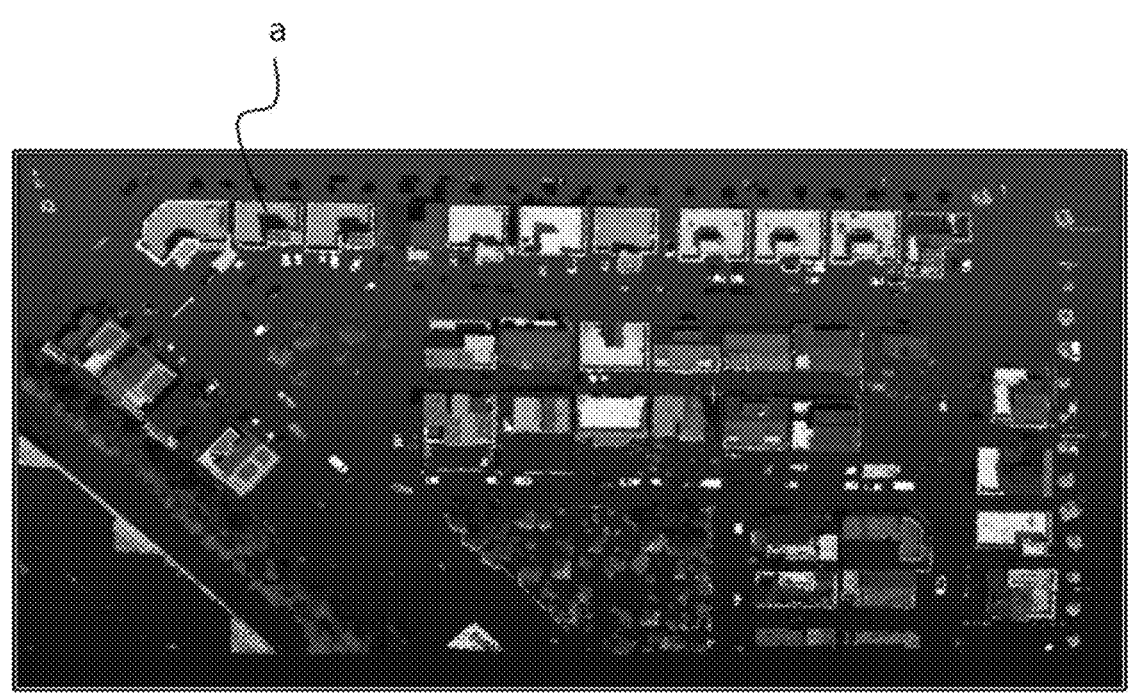
Figure 13:
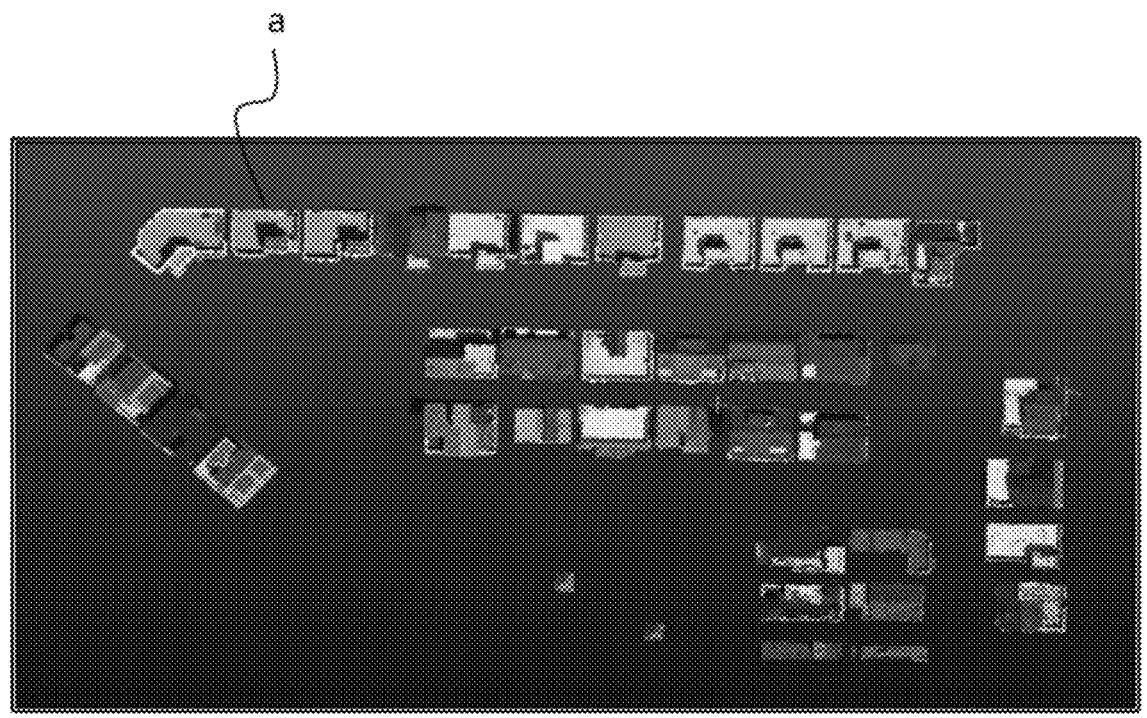

Meanwhile, FIG. 12 is a diagram illustrating a state before separating the roof of the building, and FIG. 13 is a diagram illustrating a state after separating the roof of the building.

As shown in FIGS. 12 and 13, the data generating device may perform clustering based on the density of the point cloud corresponding to the non-ground to remove an outliner and filter the clustered point cloud based on a height value from the ground to classify the point cloud corresponding to the roof of the building. That is, the building modeling part 215 may separate the clustered point cloud into vegetation and non-vegetation and filter a point cloud corresponding to non-vegetation based on the height value to classify the point cloud corresponding to the roof (a) of the building and remove the other point clouds excluding the roof (a) of the building.

Figure 14:
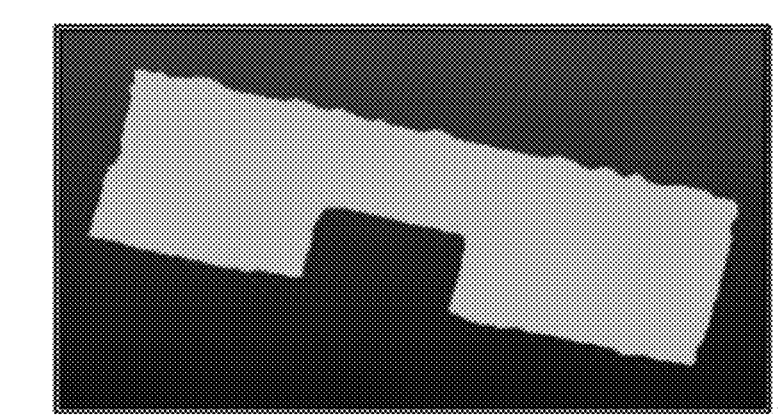
Figure 14:
Figure 14:
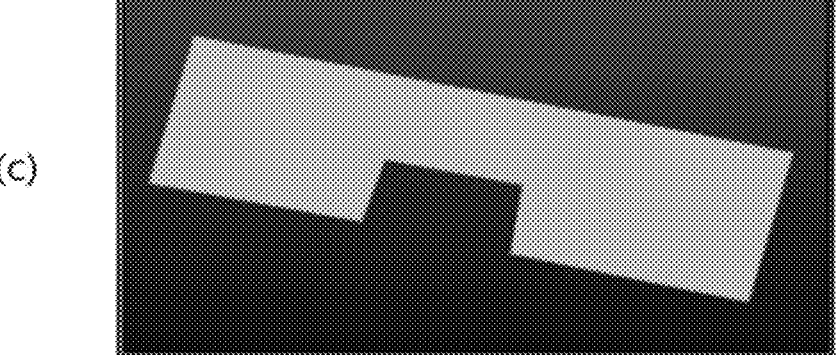

Meanwhile, FIG. 14 is a diagram illustrating the process of fitting a point cloud corresponding to a roof of a classified building.

As shown in (a), when modeling a building is performed using the classified point cloud corresponding to the roof of the building, errors may occur because the angle of the surface is not constant in a texture process.

Accordingly, as shown in (b), the data generating device may estimate the edge of the roof based on the distribution of the classified point cloud and fit the outer point of the classified point cloud based on the estimated edge.

Here, the data generating device may obtain a covariance matrix using neighboring points of each point included in the classified point cloud, obtain an eigenvector through principal component analysis (PCA) on the covariance matrix, and estimate two eigenvectors in which an angle therebetween is within a threshold value as the edge of the roof. That is, the data generating device may search for a main direction of the edge and cluster the points forming a line segment by using the fact that the angle of the roof edge of a general building is 90°.

Figure 15:
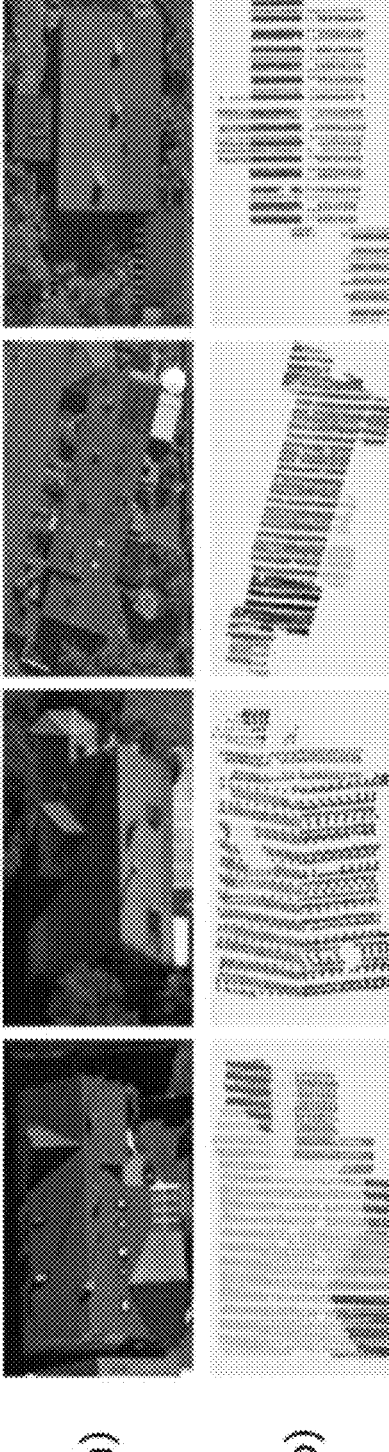

Meanwhile, as shown in FIG. 15, the data generating device may detect a basic primitive of the classified point cloud and model the classified point cloud as the roof according to the detected basic primitive.

Here, basic primitive may refer to an element (b) necessary to create graphic designs, such as lines, circles, curves, polygons, etc., that may be drawn, stored, and manipulated as individual entities by a program in the roof (a) of the building.

Figure 16:
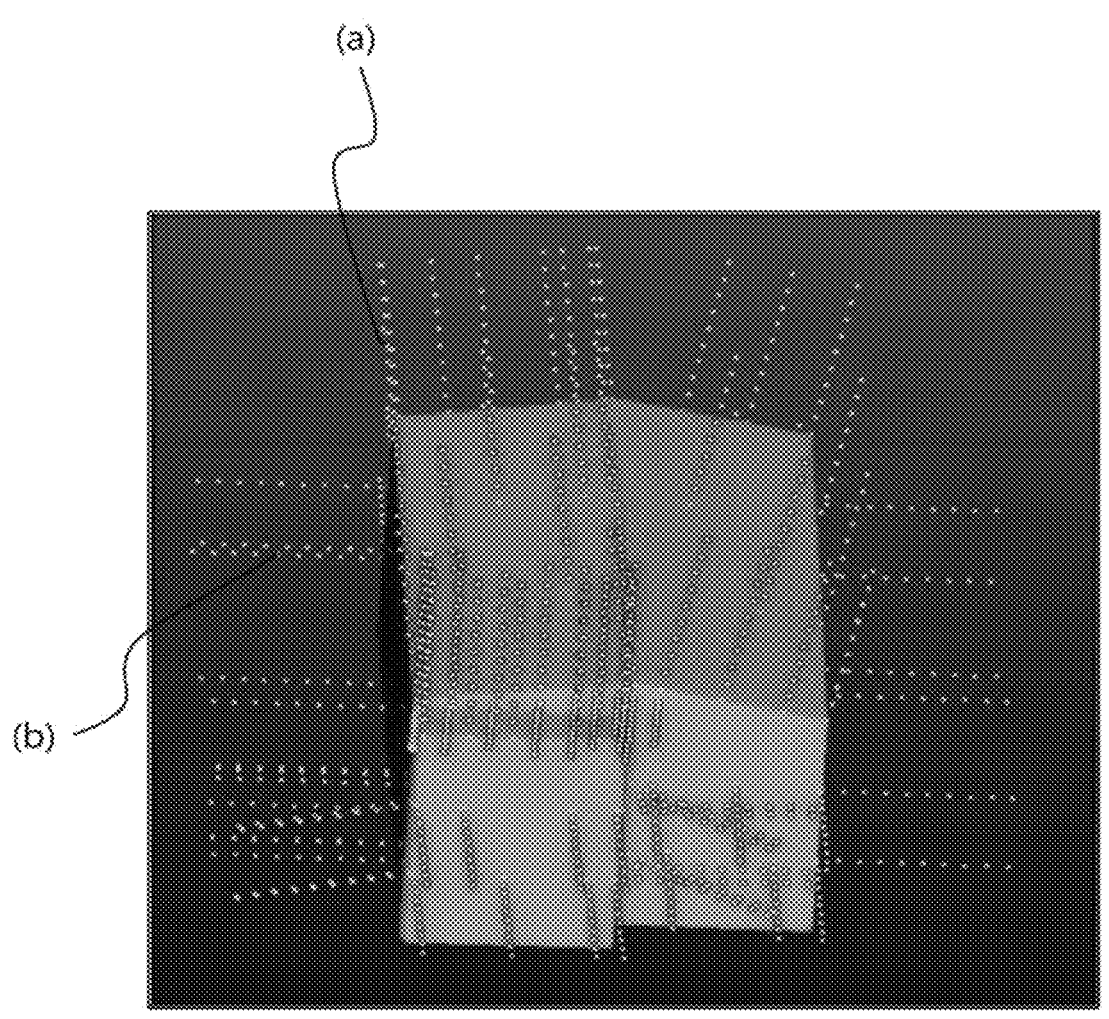

In addition, as shown in FIG. 16, the data generating device may perform texture mapping by calculating a normal vector (b) for the extracted candidate images and extracting an appropriate image among the candidate images using the direction (a) of the camera and a direction and angle of a surface on which texture mapping is to be performed based on the calculated normal vector (b).

Figure 17:
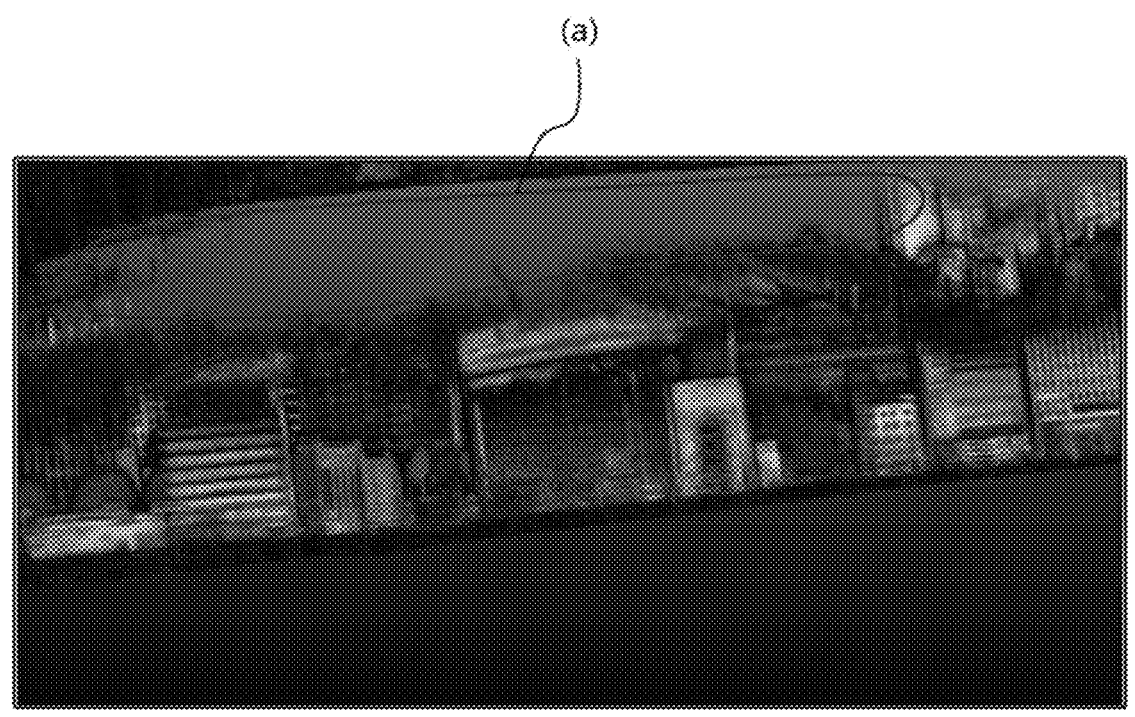
FIGS. 17 and 18 are diagrams illustrating a map updating method according to an embodiment of the present disclosure.
Figure 18:
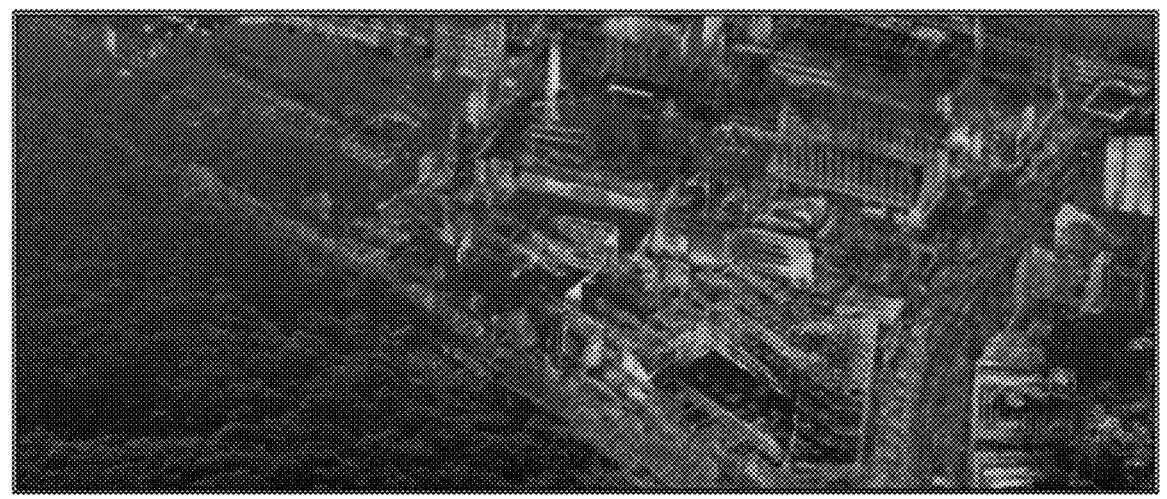

FIGS. 17 and 18 are diagrams illustrating a map updating method according to an embodiment of the present disclosure.

Specifically, FIG. 17 is a diagram illustrating a specific region of a reference map before applying the map updating method according to an embodiment of the present disclosure, and FIG. 18 is a diagram illustrating a state in which the map updating method according to an embodiment of the present disclosure is applied.

As shown in FIG. 17, since the reference map has been created based on the GPS information, there was a problem in that the map was not properly generated in a region (a) with low GPS signal sensitivity, such as alleys, or a map with serious errors was generated.

Accordingly, the data generating device may estimate the current location of the second LiDAR in real time while driving based on the second point cloud data acquired by the second LiDAR installed in the vehicle moving on the path on the reference map. Here, the data generating device may determine the accuracy of the reference map based on a threshold value of a location error rate according to location estimation.

In addition, the data generating device may extract a point cloud that needs updating based on the location error rate and update the extracted point cloud based on the second point cloud data.

Here, the data generating device may identify a point cloud that needs additional updating based on the GPS error rate in order to update the reference map with higher accuracy.

In addition, the data generating device may update the reference map for the point cloud that needs additional updating based on the third point cloud data acquired from the third LiDAR mounted on the flight device flying above the reference map.

Through this, as shown in FIG. 18, the data generating device may effectively improve shaded regions on the map by updating the map using data acquired from other sensors for regions with low GPS signal sensitivity on a precision road map generated based on GPS information.

As described above, embodiments of the present disclosure have been disclosed in the specification and drawings. However, it is self-evident to those skilled in the art to which the present disclosure pertains that other modifications may be made based on the technical concept of the present disclosure, in addition to the embodiments described herein. In addition, various embodiments of the present disclosure have been described using specific terms, but the specification and drawings are to be regarded in an illustrative rather than a restrictive sense in order to help understand the present disclosure. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

What is claimed is:

1. A building modeling method, comprising:
separating, by a data generating device, a point cloud corresponding to a ground and a plurality of point clouds corresponding to a non-ground from aerial point cloud data acquired from a LiDAR mounted on a flight device;
classifying, by the data generating device, a point cloud corresponding to a roof of a building among the plurality of point clouds corresponding to the non-ground; and
modeling, by the data generating device, the building based on the classified point cloud,
wherein, in the modeling, an edge of the roof is estimated based on a distribution of the classified point cloud, and an outer point of the classified point cloud is fit based on the estimated edge, and
wherein, in the modeling, a covariance matrix using neighboring points of each point included in the classified point cloud is obtained, an eigenvector is obtained through principal component analysis (PCA) on the covariance matrix, and two eigenvectors in which an angle therebetween is within a threshold value are estimated as the edge of the roof.

2. The building modeling method of claim 1, wherein, in the separating the point cloud,
the aerial point cloud data is voxelized to a preset size, and other points, except for a point closest to a center point, among points in a voxel, are deleted to acquire a uniform sample.

3. The building modeling method of claim 2, wherein, in the separating the point cloud, the aerial point cloud data is divided into a grid smaller than an average distance between points to generate row and column indexes for each point, a height value of the grid is set using an interpolation method when there is no point in the grid, an opening calculation is performed using a window having a preset size, cases before and after the opening calculation is performed are compared based on a height threshold value to separate the point cloud corresponding to the ground and the point cloud corresponding to the non-ground from each other.

4. The building modeling method of claim 1, wherein, in the classifying the point cloud,
the point cloud corresponding to the roof of the building and a point cloud corresponding to a tree among the plurality of point clouds corresponding to the non-ground are classified based on a number of reflected signals reflected from one pulse from the LiDAR.

5. The building modeling method of claim 4, wherein, in the classifying the point cloud,
the point cloud in which the number of reflected signals reflected from the one pulse of the LiDAR exceeds a preset value is identified as the tree.

6. The building modeling method of claim 1, wherein, in the classifying the point cloud, a point corresponding to a reflected signal having a signal strength smaller than a preset value, among reflected signals reflected from one pulse of the LiDAR is deleted.

7. The building modeling method of claim 1, wherein, in the modeling, a basic primitive of the classified point cloud is detected, and the classified point cloud is modeled as the roof according to the detected basic primitive.

8. A non-transitory computer-readable recording medium having stored thereon a computer program that, when executed by a processor, causes the processor to execute operations, comprising:

separating, by the processor, a point cloud corresponding to a ground and a plurality of point clouds corresponding to a non-ground from aerial point cloud data acquired from a LiDAR mounted on a flight device;

classifying, by the processor, a point cloud corresponding to a roof of a building among the plurality of point clouds corresponding to the non-ground; and modeling, by the processor, the building based on the classified point cloud, wherein, in the modeling, an edge of the roof is estimated based on a distribution of the classified point cloud, and an outer point of the classified point cloud is fit based on the estimated edge, and wherein, in the modeling, a covariance matrix using neighboring points of each point included in the classified point cloud is obtained, an eigenvector is obtained through principal component analysis (PCA) on the covariance matrix, and two eigenvectors in which an angle therebetween is within a threshold value are estimated as the edge of the roof.

9. A building modeling method, comprising:

separating, by a data generating device, a point cloud corresponding to a ground and a plurality of point clouds corresponding to a non-ground from aerial point cloud data acquired from a LiDAR mounted on a flight device;

classifying, by the data generating device, a point cloud corresponding to a roof of a building among the plurality of point clouds corresponding to the non-ground; and modeling, by the data generating device, the building based on the classified point cloud, wherein, in the separating the point cloud, the aerial point cloud data is voxelized to a preset size, and other points, except for a point closest to a center point, among points in a voxel, are deleted to acquire a uniform sample, and wherein, in the separating the point cloud, the aerial point cloud data is divided into a grid smaller than an average distance between points to generate row and column indexes for each point, a height value of the grid is set using an interpolation method when there is no point in the grid, an opening calculation is performed using a window having a preset size, cases before and after the opening calculation is performed are compared based on a height threshold value to separate the point cloud corresponding to the ground and the plurality of point clouds corresponding to the non-ground from each other.

* * * * *